(No Model.)
J. H. OSGOOD.
HORSE HITCHING DEVICE.
No. 272,466. Patented Feb. 20, 1883.
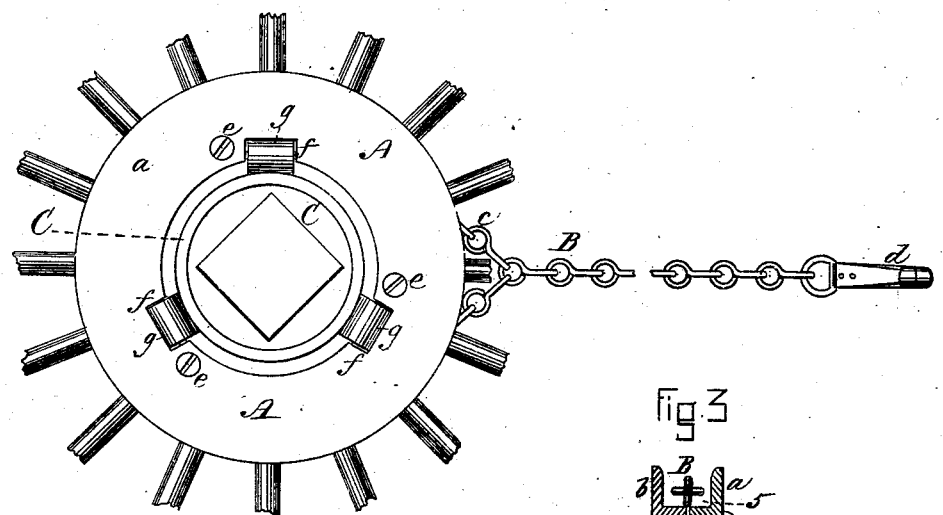
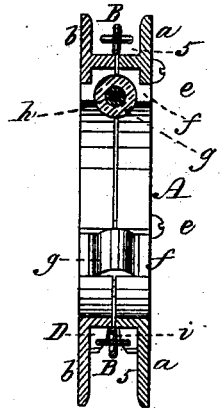
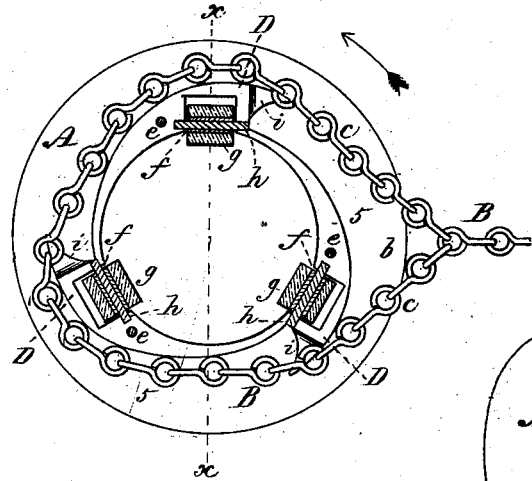
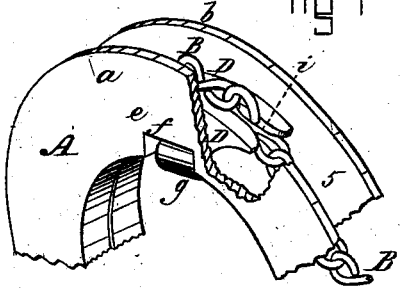
WITNESSES
W. J. Cambridge
Chas. E. Griffin
INVENTOR
James H. Osgood

UNITED STATES PATENT OFFICE.

JAMES H. OSGOOD, OF BOSTON, MASSACHUSETTS, ASSIGNOR TO HIMSELF AND DARIUS WILSON, OF SAME PLACE.

HORSE-HITCHING DEVICE.

SPECIFICATION forming part of Letters Patent No. 272,466, dated February 20, 1883.

Application filed October 23, 1882. (No model.)

*To all whom it may concern:*

Be it known that I, JAMES H. OSGOOD, a citizen of the United States, residing at Boston, in the county of Suffolk and State of Massachusetts, have invented certain Improvements in Horse-Hitchers, of which the following is a full, clear, and exact description, reference being had to the accompanying drawings, making part of this specification, in which—

Figure 1 is a side elevation of my improved horse-hitcher applied to the hub of a vehicle-wheel. Fig. 2 is a central vertical section through the hitcher detached from the hub. Fig. 3 is a section on the line $x\,x$ of Fig. 2. Fig. 4 is a perspective view of a portion of the hitcher, partly broken away to show the clutching device.

My invention has for its object to provide a simple and convenient device for preventing horses, when left standing and attached to vehicles, from straying or running away; and my invention consists in a collar or ring adapted to be applied to the hub of a vehicle-wheel and temporarily or permanently secured thereto in such manner as to be held firmly and immovably thereon, said collar having connected therewith one end of a chain, the other end of which is connected with the driving-reins or check-rein, or with the bridle-bit or head of the horse, the collar being also provided with one or more projections or clutches so constructed and arranged that when the wheel of the vehicle is turned backward the collar will be free to rotate without producing any tension upon the chain, while when the wheel is moved forward the chain will be caught and held by the clutching device and wound up around the collar, thereby drawing the horse's head backward in such manner as to prevent his further advance.

My invention also consists in certain details of construction, as hereinafter set forth, and specifically claimed.

In the said drawings, A represents a metallic ring or collar. This collar is provided on its opposite sides with flanges $a\,b$, forming a groove, 5, for the reception of the looped end $c$ of a chain, B, the opposite end of which is to be connected, by means of a snap-hook, $d$, or other suitable device, with the driving-reins or check-rein, or with the bridle-bit or head of the horse. The collar A is formed of two halves or portions held together by screws $e$, its interior diameter being such as to adapt it to be placed over the outer end of the hub C of the wheel of a vehicle, as seen in Fig. 1; and within rectangular notches or recesses $f$, formed at the inner periphery of this collar, are secured a series of short rollers, $g$, formed of rubber or other suitable material mounted upon metallic cores or bushings, and adapted to rotate on short shafts $h$, the ends of which are secured between the two portions of the collar A. These rollers $g$ project inward beyond the line of the inner periphery of the collar, and are tightly compressed when the collar is forcibly pressed over the outer end of the hub of the wheel, the rollers thus serving by their rotation to facilitate the application of the collar to the hub, and, by their friction, to hold the collar firmly and immovably in place upon the hub, and prevent any possibility of its slipping thereon, or any marring or injury of the paint on the hub, while they also admit of the collar being readily detached from the hub by pulling it with the hands when not required for use. At the bottom of the chain-groove formed by the flanges $a\,b$ are a series of projections, D, each of which is provided with a central open slot, $i$, forming a claw-shaped clutch, which will freely slide or slip beneath or past the links of the chain B without catching them or producing any tension on the chain when the collar is turned by the wheel-hub in the direction of the arrow, Fig. 2, as is the case when the horse moves backward; but when the horse moves forward and rotates the wheel and collar in the opposite direction the claw-shaped clutches D will instantly catch the links of the chain, as seen in Fig. 2, and cause it to be wound around the collar within the groove 5, thereby producing a tension on the chain and causing the horse's head to be drawn backward in such manner as to prevent his further advance, whereby all liability of his straying or running away is effectually prevented.

If preferred, instead of making the collar A detachable, as above described, it may be permanently attached to the hub of the wheel by means of screws or in any other suitable manner, in which case the rollers $g$ would be dispensed with and the loop c of the chain made detachable from the collar, while the collar, if permanently secured in place, may be applied either to the outer or inner end of the hub, as preferred.

I do not confine myself to any precise number of clutches D, as a single one or a series of any desired number may be employed, as preferred.

When made detachable, the collar A with the chain is intended, when removed from the hub, to be carried in the vehicle or otherwise disposed of in the same manner as the ordinary weight in common use; but where the collar is permanently secured to the hub the chain only is to be removed when the apparatus is not in use.

Among other advantages possessed by my improved horse-hitching device may be enumerated the following: First, lightness of weight and consequent convenience in handling; second, perfect security, as a horse cannot possibly "get away" when thus secured to the wheel of the vehicle to which he is harnessed; third, facility of application or adjustment upon the hub of the wheel and ease of detachment when not required for use; fourth, freedom from unsightliness and from liability of marring or injuring the paint or varnish and defacing the wheel.

What I claim as my invention, and desire to secure by Letters Patent, is—

1. In a horse-hitching device, the combination, with the hub of a vehicle-wheel, of the detachable ring or collar A, adapted to be temporarily secured upon the outer end thereof in such manner as to prevent slip, and provided with the chain B, and means for clutching and holding the same and causing it to be wound around or upon the said collar when the wheel is moved forward, substantially as and for the purpose set forth.

2. In a horse-hitching device, the combination, with the ring or collar A, of the rollers $g$, applied to its inner periphery, and adapted to bear upon the outer surface of the hub and prevent the collar from slipping thereon, substantially as described.

3. In a horse-hitching device, the combination, with the detachable grooved collar A and its chain B, of the claw-shaped projections or clutches D, adapted to catch and hold the chain and cause it to be wound around or upon the collar between the flanges $a\ b$ when the wheel is moved forward, and allow the collar to rotate freely within the loop of the chain when rotated in the opposite direction, substantially in the manner and for the purpose set forth.

Witness my hand this 13th day of October, A. D. 1882.

JAMES H. OSGOOD.

In presence of—
P. E. TESCHEMACHER,
EBEN S. HANSON.